(12) United States Patent
Hattori et al.

(10) Patent No.: US 7,838,586 B2
(45) Date of Patent: Nov. 23, 2010

(54) RESIN COMPOSITION AND PROCESS FOR PRODUCING THE SAME

(75) Inventors: Jun Hattori, Takasago (JP); Kazuhiko Ueda, Kobe (JP); Shintaro Komitsu, Takasago (JP)

(73) Assignee: Kaneka Corporation, Osaka (JP)

( * ) Notice: Subject to any disclaimer, the term of this patent is extended or adjusted under 35 U.S.C. 154(b) by 949 days.

(21) Appl. No.: 10/554,509

(22) PCT Filed: Apr. 21, 2004

(86) PCT No.: PCT/JP2004/005752

§ 371 (c)(1), (2), (4) Date: Mar. 8, 2006

(87) PCT Pub. No.: WO2004/096913

PCT Pub. Date: Nov. 11, 2004

(65) Prior Publication Data

US 2006/0211799 A1   Sep. 21, 2006

(30) Foreign Application Priority Data

May 2, 2003   (JP) .............................. 2003-127366

(51) Int. Cl.
*C08K 3/30* (2006.01)
(52) U.S. Cl. .................. 524/418; 524/420; 524/502; 525/107; 525/222; 526/318.1
(58) Field of Classification Search ............... 524/418, 524/420, 502; 525/107, 222; 526/318.1
See application file for complete search history.

(56) References Cited

U.S. PATENT DOCUMENTS

| 5,502,122 | A | * | 3/1996 | Weber et al. ................ 525/534 |
| 5,900,451 | A | * | 5/1999 | Krishnan et al. ............ 524/502 |
| 2003/0176576 | A1 | * | 9/2003 | Fujita et al. ................ 525/107 |

FOREIGN PATENT DOCUMENTS

| EP | 0 265 929 A2 | 5/1988 |
| EP | 1 000 980 A1 | 5/2000 |
| EP | 1 288 247 A1 | 3/2003 |
| JP | 63-161052 A | 7/1988 |
| JP | 1-272654 A | 10/1989 |
| JP | 3-263478 A | 11/1991 |
| JP | 07-206973 A | 8/1995 |
| JP | 07206973 A * | 8/1995 |
| JP | 7-258536 A | 10/1995 |
| JP | 2000-129145 A | 5/2000 |
| JP | 2000-129147 A | 5/2000 |
| JP | 2002-053760 A | 2/2002 |
| JP | 2002053760 A * | 2/2002 |
| JP | 2002-294022 A | 10/2002 |
| JP | 2003-96195 A | 4/2003 |
| JP | 2003096195 A * | 4/2003 |
| JP | 2006077036 A * | 3/2006 |

* cited by examiner

*Primary Examiner*—David Wu
*Assistant Examiner*—Michael M Bernshteyn
(74) *Attorney, Agent, or Firm*—Sughrue Mion, PLLC

(57) ABSTRACT

By further incorporating a reductant into a composition including an oxyalkylene polymer prepared by polymerization in the presence of a cobalt-containing double metal cyanide complex catalyst; and an acrylic polymer prepared by radical polymerization in the presence of a mercapto group-containing compound, a resin composition in which excessive coloration is prevented and that is suitably used for an adhesive or the like is prepared.

7 Claims, No Drawings ized in the presence of a mercapto group-containing compound and/or a mercapto group-containing compound, and provides a process for producing the resin composition.
RESIN COMPOSITION AND PROCESS FOR PRODUCING THE SAME

RELATED APPLICATION

This application is a national stage of PCT application PCT/JP2004/005752 filed on Apr. 21, 2004, claiming priority based on Japanese Application No. 2003-127366 filed on May 2, 2003, the contents of which are incorporated herein by reference in their entirety.

TECHNICAL FIELD

The present invention relates to a resin composition including an oxyalkylene polymer and an acrylic polymer and/or a mercapto group-containing compound, the resin composition being usable as an adhesive or the like. In particular, the present invention relates to a resin composition in which excessive coloration is prevented and a process for producing the resin composition.

BACKGROUND ART

As a resin composition including an oxyalkylene polymer and an acrylic polymer, for example, a curable urethane composition including a polyetherpolyol, an acrylic polyol, and a polyisocyanate compound and a curable composition, which can be used as a solventless contact adhesive, including a hydrolyzable silicon group-containing oxyalkylene polymer and a hydrolyzable silicon group-containing acrylic polymer are known, the curable composition being disclosed in Japanese Unexamined Patent Application Publication No. 3-263478 and Japanese Unexamined Patent Application Publication No. 7-258536.

With respect to the oxyalkylene polymer used in such a resin composition, an oxyalkylene polymer prepared by ring-opening polymerization of an alkylene oxide in the presence of a cobalt-containing double metal cyanide complex catalyst can have a number-average molecular weight of 8,000 or more with narrow molecular-weight distribution and is advantageous from the standpoint of the flexibility of a cured product prepared from the curable resin composition, viscosity of the composition, and workability. With respect to the acrylic polymer, an acrylic polymer prepared by radical polymerization in the presence of a mercapto group-containing compound is advantageous in easy adjustment of the molecular weight, compatibility with the oxyalkylene polymer in the resin composition, and the adjustment of the viscosity of the composition. The mercapto group-containing compound can be added to a composition in order to modify, for example, an unsaturated group-containing oxyalkylene polymer and a curable urethane composition, and to adjust the curability of a curable composition containing a hydrolyzable silicon group.

However, a resin composition including an oxyalkylene polymer prepared by the above-described specific production process and an acrylic polymer prepared by the above-described specific production process and/or a mercapto group-containing compound is excessively colored, in particular, red-colored. Thereby, the appearance of a cured product produced from the resin composition or the curable resin composition may be significantly impaired. This coloration is particularly disadvantageous, for example, when the resin composition is used as a transparent composition, in particular, as a transparent adhesive for bonding a transparent component, and when a specific-colored composition is required, in particular, when a light color, such as white or beige, is required.

DISCLOSURE OF INVENTION

In view of the above-described problems, the present invention provides a resin composition, in which coloration is prevented, including an oxyalkylene polymer prepared by ring-opening polymerization of an alkylene oxide in the presence of a cobalt-containing double metal cyanide complex catalyst and an acrylic polymer prepared by radical polymerization in the presence of a mercapto group-containing compound and/or a mercapto group-containing compound, and provides a process for producing the resin composition.

As a result of intensive research to solve the problems, the present inventors found that coloration can be prevented when a reductant is added to the resin composition. This finding resulted in completion of the present invention.

That is, the present invention provides 1. a resin composition including an oxyalkylene polymer (A) prepared by ring-opening polymerization of an alkylene oxide using a cobalt-containing double metal cyanide complex catalyst in the presence of a compound that serves as an initiator and that has an active hydrogen-containing group that can react with the alkylene oxide; an acrylic polymer and/or a mercapto group-containing compound (B), the acrylic polymer being prepared by radical polymerization of an alkyl (meth)acrylate containing an alkyl group having 1 to 30 carbon atoms in the presence of a mercapto group-containing compound; and a reductant (C); 2. in the curable resin composition described above, the reductant (C) is at least one selected from ascorbic acid and derivatives thereof, sulfur, and a sulfite; 3. in the curable resin composition described in 1 or 2, the oxyalkylene polymer (A) contains a hydrolyzable silicon group; 4. in the curable resin composition described in one of 1 to 3, the acrylic polymer (B) contains a hydrolyzable silicon group; and 5. a process for producing the resin composition described above, the process including mixing (A) and (B) in the presence of (C).

BEST MODE FOR CARRYING OUT THE INVENTION

The present invention will be described in detail below.
<Oxyalkylene Polymer>

An oxyalkylene polymer (A) (hereinafter, also simply referred to as "oxyalkylene polymer"), which is used in the present invention and prepared by ring-opening polymerization of an alkylene oxide using a cobalt-containing double metal cyanide complex catalyst in the presence of a compound serving as an initiator and having an active hydrogen-containing group that can react with the alkylene oxide, is obtained by methods disclosed in, for example, U.S. Pat. Nos. 3,278,457, 3,278,458, and 3,278,459.

The compound serving as an initiator and having an active hydrogen-containing group that can react with the alkylene oxide is not particularly limited. Examples thereof include polyhydroxy compounds, having 2 to 8 hydroxyl groups, for example, dihydric alcohols such as ethylene glycol and propylene glycol, trihydric alcohols such as glycerol, trimethylolpropane, and hexanetriol, and tetra- or higher-hydric alcohols such as pentaerythritol, diglycerol, dextrose, sorbitol, and sucrose; compounds having a phenolic hydroxyl group or a methylol group, for example, bisphenol A, resole, and novolac; compounds having a hydroxyl group and other active hydrogen, for example, ethanolamine and diethanolamine; and polyethers prepared by allowing a compound having an active hydrogen-containing functional group, for example, poly(oxypropylene diol) and poly(propylene triol), to react with a monoepoxide such as an alkylene oxide.

As the alkylene oxide, in particular, an alkylene oxide having 2 or more carbon atoms is preferable. Examples thereof include ethylene oxide, propylene oxide, 1,2-butylene oxide, 2,3-butylene oxide, and epichlorohydrin. Furthermore, the alkylene oxide can be used in combination with other monoepoxide such as styrene oxide, glycidyl ether, and a glycidyl ester.

As the cobalt-containing double metal cyanide complex, for example, a compound prepared by allowing a hexacyanocobaltate salt to react with a metal salt and then acting an ether, such as glyme and diethylene glycol dimethyl ether; a nitrile; a sulfide; an ester; a ketone; or an aldehyde, as an organic ligand. A specific example is a zinc hexacyanocobaltate glyme complex.

The oxyalkylene polymer is prepared by reaction of a mixture containing an alkylene oxide and a compound, serving as an initiator, having an active hydrogen-containing group that can react with the alkylene oxide in the presence of a cobalt-containing double metal cyanide complex. Here, a process of sequentially adding the alkylene oxide to the reaction system can also be employed. The content of the cobalt-containing double metal cyanide complex is preferably 1 to 5,000 ppm and particularly preferably 30 to 1,500 ppm relative to the compound, serving as an initiator, having an active hydrogen-containing group that can react with the alkylene oxide. After the completion of the reaction, an operation for inactivating and removing the cobalt-containing double metal cyanide complex or its decomposition product can be performed. The resulting oxyalkylene polymer has the number of hydroxyl groups at its termini in response to that of the functional groups in the compound, serving as an initiator, having an active hydrogen-containing group that can react with the alkylene oxide.

The oxyalkylene polymer can be used for a curable urethane composition or the like by directly using the reactivity of the terminal hydroxyl group. Alternatively, other functional group may be introduced into the oxyalkylene polymer.

Examples of the other functional group include aralkyl groups; unsaturated groups such as a vinyl group; an isocyanato group; an epoxy group; a hydrolyzable silicon group represented by general formula (1):

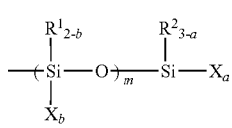

formula (1)

(wherein $R^1$ and $R^2$ each represent an alkyl group having 1 to 20 carbon atoms, an aryl group having 6 to 20 carbon atoms, an aralkyl group having 7 to 20 carbon atoms, or a triorganosiloxy group represented by $(R')_3SiO-$; when there are two or more $R^1$s or $R^2$s, they may be the same or different; R' represents a monovalent hydrocarbon group having 1 to 20 carbon atoms, and three R's may be the same or different; X represents a hydroxyl group or hydrolyzable group, and when there are two or more Xs, they may be the same or different; a represents 0, 1, 2 or 3; b represents 0, 1, or 2; bs in the group represented by

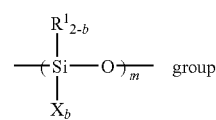

formula (2)

may be the same or different; m represents an integer of 0 to 19; and $a+\Sigma b \geq 1$ is satisfied). The hydrolyzable group represented by X is not particularly limited but may be any known hydrolyzable group. Specific examples thereof include a hydrogen atom, a halogen atom, an alkoxy group, an acyloxy group, a ketoximato group, an amino group, an amido group, an acid amido group, an aminooxy group, a mercapto group, alkenyloxy group. Among these, a hydrogen atom, an alkoxy group, an acyloxy group, a ketoximato group, an amino group, an amido group, an aminooxy group, a mercapto group, and an alkenyloxy group are preferred. An alkoxy group such as a methoxy group is particularly preferred from the standpoint of mild hydrolyzability and ease of handling. One to three hydroxyl groups or hydrolyzable groups can be bonded to one silicon atom, and $(a+\Sigma b)$ is preferably 1 to 5. When there are two or more hydroxyl groups or hydrolyzable groups in the reactive silicon group, they may be the same or different. The number of silicon atoms in the reactive silicon group may be one or may be two or more. In the case of a reactive silicon group having silicon atoms linked by siloxane bonding or the like, the number of silicon atoms may be about 20. Furthermore, a reactive silicon group represented by general formula (3):

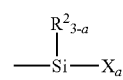

formula (3)

(wherein $R^1$, X, and a are the same as above) is preferable because of high availability. Specific examples of $R^1$ and $R^2$ in general formula (3) include alkyl groups such as a methyl group and an ethyl group; cycloalkyl groups such as a cyclohexyl group; aryl groups such as phenyl group; aralkyl groups such as benzyl group; and a triorganosiloxy group represented by $(R')_3SiO-$ in which R' is a methyl group, a phenyl group, or the like. A methyl group is particularly preferable for each of $R^1$, $R^2$, and R'. At least 1 and preferably 1.1 to 5 of the reactive silicon group should be introduced into the oxyalkylene polymer.

The reactive silicon group may be introduced by any known method. That is, examples of the method include the following: In method (I), an oxyalkylene polymer having a hydroxyl group is allowed to react with an organic compound having both an active group showing reactivity toward the hydroxyl group and an unsaturated group to prepare an unsaturated group-containing oxyalkylene polymer. Alternatively, an unsaturated group-containing oxyalkylene polymer is prepared by copolymerization with an unsaturated group-containing epoxy compound. The resulting reaction product is hydrosilylated with a reactive silicon group-containing hydrosilane. In method (II), an unsaturated group-containing oxyalkylene polymer prepared as in method (I) is allowed to react with a compound having a mercapto group and a reactive silicon group. In method (III), an oxyalkylene polymer having a functional group (hereinafter, referred to as a "Y functional group"), such as hydroxyl group, an isocyanato group introduced by allowing a hydroxyl group to react with a polyisocyanate compound, or an epoxy group introduced by allowing a hydroxy group to react with an organic compound having an active group showing reactivity toward a hydroxyl group and epoxy group, is allowed to react with a compound having a functional group, showing reactivity toward the Y functional group (hereinafter, referred to as a "Y' functional group), and a reactive silicon group.

Specific examples of a silicon compound having the Y' functional group include amino group-containing silanes such as γ-(2-aminoethyl)aminopropyltrimethoxysilane, γ-(2-aminoethyl)aminopropyldimethoxysilane, and γ-aminopropyltriethoxysilane; mercapto group-containing silanes such as γ-mercaptopropyltrimethoxysilane and γ-mercaptopropyldimethoxysilane; epoxysilanes such as γ-glycidoxypropyltrimethoxysilane and β-(3,4-epoxycyclohexyl)ethyltrimethoxysilane; vinyl-type unsaturated group-containing silanes such as vinyltriethoxysilane, γ-methacryloyloxypropyltrimethoxysilane, and γ-acryloyloxypropylmethyldimethoxysilane; chlorine atom-containing silanes such as γ-chloropropyltrimethoxysilane; isocyanato-containing silanes such as γ-isocyanatopropyltriethoxysilane and γ-isocyanatopropylmethyldimethoxysinale; and hydrosilanes such as methyldimethoxysilane, trimethoxysilane, and methyldiethoxysilane. The silicon compound is not limited thereto.

Among the methods described above, method (I) or a method, among method (III), in which a hydroxyl group-terminated polymer is allowed to react with a compound having an isocyanato group and a reactive silicon group is preferred. The reactive silicon group-containing oxyalkylene polymer is not particularly limited. Typical examples thereof are disclosed in Japanese Unexamined Patent Application Publication No. 50-156599, Japanese Unexamined Patent Application Publication No. 54-6069, Japanese Unexamined Patent Application Publication No. 57-126823, Japanese Unexamined Patent Application Publication No. 59-78223, Japanese Unexamined Patent Application Publication No. 55-82123, Japanese Unexamined Patent Application Publication No. 55-131022, Japanese Unexamined Patent Application Publication Nos. 55-47825, 62-230822, 63-83131, 3-47825, 3-72527, and 3-122152, U.S. Pat. Nos. 3,632,557, 4,345,053, 4,366,307, and 4,960,844.

<Acrylic Polymer>

Among (B) used in the present invention, an acrylic polymer (hereinafter, simply referred to as an "acrylic polymer") prepared by radical polymerization of a monomer including alkyl (meth)acrylate containing an alkyl group having 1 to 30 carbon atoms in the presence of a mercapto group-containing compound is not particularly limited, but is prepared by, for example, a usual solution polymerization or bulk polymerization, in which a monomer is subjected to radical polymerization using a radical polymerization initiator in the presence of a mercapto group-containing compound.

Examples of the alkyl(meth)acrylate containing an alkyl group having 1 to 30 carbon atoms include alkyl (meth) acrylates each having 1 to 30 carbon atoms, for example, methyl(meth)acrylate, ethyl(meth)acrylate, n-butyl (meth) acrylate, isobutyl(meth)acrylate, tert-butyl (meth)acrylate, 2-ethylhexyl(meth)acrylate, lauryl (meth)acrylate, tridecyl (meth)acrylate, cetyl (meth)acrylate, and behenyl(meth) acrylate; and cycloalkyl (meth)acrylates each having 4 to 30 carbon atoms, for example, cyclohexyl(meth)acrylate, isobornyl(meth)acrylate, adamantyl(meth)acrylate, and dicyclopentanyl(meth)acrylate. For example, when a composition is used as an adhesive, 50 percent by weight or more of an alkyl(meth)acrylate described above is preferably used in 100 percent by weight of a monomer mixture from the standpoint of adhesion.

Among alkyl(meth)acrylates described above, use of 3 percent by weight or more of an alkyl(meth)acrylate containing an alkyl group having 10 to 30 carbon atoms, such as lauryl(meth)acrylate, tridecyl(meth)acrylate, cetyl (meth) acrylate, or behenyl(meth)acrylate, in 100 percent by weight of a monomer mixture improves compatibility with oxyalkylene polymer (A) and is thus preferable from the standpoint of the transparency of a curable composition and the transparency of a cured product produced from a composition.

Furthermore, to impart crosslinkability in curing, a hydroxyl group, an isocyanato group, an epoxy group, or a hydrolyzable silicon group in general formula (1) may be introduced. Such a functional group is introduced by, for example, using a vinyl monomer containing the corresponding functional group in polymerization or converting a functional group in an acrylic polymer into the corresponding functional group. Examples of an unsaturated monomer containing such a functional group include hydroxyl group-containing vinyl monomers such as 2-hydroxyethyl (meth)acrylate, 2-hydroxypropyl(meth)acrylate, glycerol mono(meth)acrylate, a polyoxyalkylene mono(meth)acrylate, 2-hydroxyethyl vinyl ether, and hydroxystyrene; isocyanato group-containing vinyl monomers such as 2-isocyanatoethyl (meth)acrylate and m-isopropenyl-α,α-dimethylbenzyl isocyanate; epoxy group-containing vinyl monomers such as glycidyl(meth)acrylate and oxycyclohexynyl(meth)acrylate; and hydrolyzable silicon group-containing vinyl monomers such as vinyltrimethoxysilane, vinyltriethoxysilane, vinyltri (n-propoxy)silane, vinyltriisopropoxysilane, vinyltributoxysilane, vinyltris(β-methoxyethoxy)silane, allyltriethoxysilane, trimethoxysilylpropylallylamine, γ-(meth) acryloxypropyltrimethoxysilane, γ-(meth) acryloxypropyltriethoxysilane, γ-(meth) acryloxypropyltriisopropoxysilane, γ-(meth) acryloxypropyltris(β-methoxyethoxy)silane, γ-(meth) acryloxypropylmethyldimethoxysilane, γ-(meth) acryloxypropylmethyldiethoxysilane, γ-(meth) acryloxypropyldimethylmethoxysilane, γ-(meth) acryloxypropyldimethylethoxysilane, N-vinylbenzyl-γ-aminopropyltrimethoxysilane, 2-styrylethyltrimethoxysilane, 3-(N-styrylmethyl-2-aminoethylamino)propyltrimethoxysilane, (meth)acryloxyethyldimethyl(3-trimethoxysilylpropyl)ammonium chloride, vinyltriacetoxysilane, and vinyltrichlorosilane. In particular, a hydrolyzable silicon group is suitable for a functional group introduced from the standpoint of adhesion and curing properties when a composition is used as an adhesive.

Examples of other monomer that can be used include vinyl esters, such as vinyl acetate, vinyl propionate, and vinyl versatate; allyl compounds such as diallyl phthalate; nitrile group-containing vinyl monomers such as (meth)acrylonitrile; aromatic hydrocarbon vinyl monomers such as styrene, α-methylstyrene, chlorostyrene, and vinyltoluene; and other compounds such as vinyl methyl ether, vinyl chloride, vinylidene chloride, chloroprene, propylene, and butadiene.

The mercapto group-containing compound functions as a chain transfer agent. Examples thereof include alkyl mercaptans such as n-dodecyl mercaptan, tert-dodecyl mercaptan, and n-butyl mercaptan; alkanol mercaptans such as mercaptoglycerol; alkyl esters of alkanol mercaptans; alkyl mercaptoacetate; alkyl mercaptopropionate; and mercaptoalkyl group-containing silane compounds such as γ-mercaptopropyltrimethoxysilane, γ-mercaptopropyltriethoxysilane, and γ-mercaptopropylmethyldimethoxysilane. The amount of the mercapto group-containing compound used is 0.001 to 60 parts by weight relative to 100 parts by weight of a monomer mixture. Furthermore, other chain transfer agent such as styrene dimer may be used.

Examples of the radical initiator include azo compounds such as azobisisobutyronitrile, azobis(2-methylbutyronitrile), and azobis(2,4-dimethylbutyronitrile); and organic peroxides such as benzoyl peroxide, cumene hydroperoxide, p-menthane hydroperoxide, dibutyl peroxide, diisopropyl peroxydicarbonate, tert-butyl peroxyoctanoate, cumyl peroxyneodecanoate, and cumyl peroxyoctanoate. The amount of the radical initiator used is 0.001 to 60 parts by weight relative to 100 parts by weight of a monomer mixture.

Polymerization is performed by reaction of a monomer, mercapto group-containing compound, and a radical initiator at 50° C. to 150° C. From the standpoint of ease of reaction and slow heating, solution polymerization is preferred. In this case, a solvent nonreactive to a functional group in polymerization is preferred. Examples thereof include alcohols such as isopropanol, n-butanol, and isobutanol; glycol ethers such as ethylene glycol monobutyl ether; ethers such as dipropylene glycol dimethyl ether; and hydrocarbons such as toluene, xylene, and naphtha. The resulting acrylic polymer has a number-average molecular weight of 500 to 30,000.

<Mercapto Group-Containing Compound>

Among (B) used in the present invention, a specific example of the mercapto group-containing compound is a mercapto group-containing compound serving as a chain transfer agent used in preparing the acrylic polymer.

<Reductant>

A reductant (C) used in the present invention is an essential component for preventing coloration generated in (A) and (B). Specific examples thereof include ascorbic acid and derivatives thereof, for example, L-ascorbic acid, D-isoascorbic acid, ascorbates esters such as stearyl ascorbate, and ascorbate salts such as ascorbic acid ketal, ascorbic acid acetal, and sodium ascorbate; sulfur compounds such as sulfur, hydrogen sulfide, metal sulfides, and sulfanes; phosphorous compounds such as alkylphosphite; sulfites such as rongalite; and other reductants such as hydrazide compounds, aldehydes, and saccharides, which are general reductants. The amount of the reductant used is 0.00001 to 10 parts by weight relative to 100 parts by weight of the total of (A) and (B), which are resin components. Among these reductants, in particular, ascorbic acid, derivatives thereof, and sulfur have the significant effect of preventing coloration and are effectively used in an amount of 0.00001 to 0.1 parts by weight relative to 100 parts by weight of the total of (A) and (B), which are resin components. Furthermore, ascorbic acid, derivatives thereof, and sulfur have satisfactory solubility in a composition and are preferable from the standpoint of small effect on the appearance of a composition, curing properties in a curable composition, and stability.

<Resin Composition>

A resin composition of the present invention includes an oxyalkylene polymer (A) prepared by ring-opening polymerization of an alkylene oxide using a cobalt-containing double metal cyanide complex catalyst in the presence of a compound that serves as an initiator and that has an active hydrogen-containing group that can react with the alkylene oxide; an acrylic polymer and/or a mercapto group-containing compound (B), the acrylic polymer being prepared by radical polymerization of monomers including an alkyl(meth)acrylate containing an alkyl group having 1 to 30 carbon atoms in the presence of a mercapto group-containing compound; and a reductant (C). The ratio between these components is different depending on the type of usage. The weight ratio of (A) to (B), i.e., (A)/(B), is 99.99/0.01 to 1/99, and (C) is 0.00001 to 10 percent by weight as described above, relative to 100 percent by weight of the total of (A) and (B), which are resin components. A process for producing the composition is not particularly limited as long as (A) is brought into contact with (B) in the presence of (C). Examples of the process include the following:

(C) is mixed into (A) and then (B) is mixed into the resulting mixture;

(C) is mixed into (B) and then (A) is mixed into the resulting mixture; and (A), (B), and (C) are mixed at the same time.

The components can be mixed by a general method, for example, by a method of mixing or kneading with a vessel having a stirrer, a mixer, rollers, a kneader, or the like at room temperature or under heating or a method of dissolving a component in a small amount of a solvent, followed by mixing. Furthermore, when (B) is an acrylic polymer prepared by solution polymerization, for example, a procedure in which the resulting polymer solution is mixed according to the above-described procedure and then a solvent is degassed may be employed. (C) may be directly added. Alternatively, (C) is dissolved into a solution and then the resulting solution may be added. In particular, a solid compound, for example, ascorbic acid or a derivative thereof is preferably added in the form of a solution from the standpoint of solubility and the effect of preventing coloration.

Specific examples of the composition include the following:

a curable resin composition prepared by adding and mixing (C) into (A) or (B) and then mixing the resulting mixture and (B) or (A), (A) being a hydrolyzable silicon group-containing oxyalkylene polymer, and (B) being an acrylic polymer;

a resin composition prepared by adding and mixing (C) into (A) or (B) and then mixing the resulting mixture and (B) or (A), (A) being a hydroxyl group-terminated oxyalkylene polymer, and (B) being an acrylic polymer;

a curable resin composition prepared by adding and mixing (C) into (A) and then allowing (B) to react with an unsaturated group in (A), (A) being an unsaturated group-containing oxyalkylene polymer, and (B) being a mercaptoalkyl group-containing silane compound such as γ-mercaptopropyltrimethoxysilane;

a curable resin composition prepared by allowing (A) to react with a polyisocyanate compound to convert a hydroxyl group into an isocyanato group, adding and mixing (C) into the reaction product, and allowing (B) to react with the resulting isocyanato group, (A) being a hydroxyl group-terminated oxyalkylene polymer, and (B) being a mercaptoalkyl group-containing silane compound such as γ-mercaptopropyltrimethoxysilane;

a curable resin composition prepared by adding and mixing (C) to (A), allowing a polyisocyanate compound to react with the resulting mixture to convert a hydroxyl group into an isocyanato group, and allowing (B) to react with the resulting isocyanato group, (A) being a hydroxyl group-terminated oxyalkylene polymer, and (B) being a mercaptoalkyl group-containing silane compound such as γ-mercaptopropyltrimethoxysilane;

a curable resin composition prepared by adding and mixing (C) to (A) and then adding (B), (A) being a hydrolyzable silicon group-containing oxyalkylene polymer and/or a hydroxyl group-terminated oxyalkylene polymer, and (B) being a mercaptoalkyl group-containing silane compound such as γ-mercaptopropyltrimethoxysilane;

The details of the prevention of coloration in a resin composition according to the present invention are sketchy. It is estimated that (C) acts on the effect of exhibiting red due to the cobalt compound derived from a cobalt-containing double metal cyanide complex catalyst contained in (A) and (B) or some sort of compound contained in (B); or acts on these compounds functioning as a source of coloration.

None of the resin compositions according to the present invention is colored excessively. Thus, the resin composition is useful for use in a transparent or light-colored adhesive, sealant, or filler composition.

The resin composition according to the present invention further contains a usual additive, such as a filler, a tackifier, a viscosity adjuster, an antioxidant, a light stabilizer, an ultraviolet absorber, a solvent, and a plasticizer. In the case of a curable resin composition containing a hydrolyzable silicon group, for example, an organic titanium compound such as a titanium orthoester; an organic tin compound such as dibutyltin dilaurate, dibutyltin maleate, dibutyltin diacetate, dibutyltin diacetylacetonate, tin octylate, tin naphthenate, tin versatate; an organic aluminum compound; an organic zirconium compound; an organic bismuth compound; an amine compound such as octylamine, laurylamine, or 1,8-diazabicyclo[5,4,0]undecene-7 (DBU); an organic acid such as a carboxylic acid, a sulfonic acid, an acid phosphate ester; or a compound prepared by reaction of an organic acid and an amine compound, may be added as a condensation catalyst.

EXAMPLES

The resin composition according to the present invention will be described in detail on the basis of Synthetic examples and Examples. However, the present invention is not limited thereto.

Synthetic Example 1

Synthesis of Hydroxyl Group-Terminated Oxyalkylene Polymer (A-1)

Polypropylene triol having a molecular weight of about 3,000 was used as an initiator. Propylene oxide was polymerized using a zinc hexacyanocobaltate glyme complex to prepare a hydroxyl group-terminated oxypropylene polymer (A-1) having a number-average molecular weight of about 15,000 (molecular weight calculated from the measured concentration of the terminal hydroxyl group).

Synthetic Example 2

Synthesis of Unsaturated Group-Containing Oxyalkylene Polymer (A-2)

To the (A-1), 1.2 times equivalents of sodium methoxide was added relative to the hydroxyl group in (A-1). After methanol was distilled off under heating in vacuo, 3-chloro-1-propene was added to the mixture to replace the hydroxyl group with an allyl group. Hexane and water were added thereto to extract ionic impurities into an aqueous phase. Then, the resulting aqueous phase was separated. A hexane phase was degassed by evacuation and concentrated. Thereby, an ally group-terminated oxypropylene polymer (A-2) was prepared. It was found by inductively coupled plasma (ICP) spectrometry that this polymer had a Zn-content of 4 ppm and a Co-content of 0.8 ppm.

Synthetic Example 3

Synthesis of Hydrolyzable Silicon Group-Containing Oxyalkylene Polymer (A-3)

A catalytic amount of an isopropyl alcohol solution of platinic chloride was added to the (A-2). The resulting mixture was allowed to react with dimethoxymethylsilane to prepare a dimethoxymethylsilyl group-terminated oxypropylene polymer (A-3).

Synthetic Example 4

Synthesis of Isocyanate Group-Containing Oxyalkylene Polymer (A-4)

To the (A-1), 200 ppm of tin octylate was added. Then, 1.2 times equivalents of methylenebisphenyl isocyanate (MDI) was added relative to the hydroxyl group to prepare an isocyanato group-containing oxypropylene polymer (A-4).

Synthetic Example 5

Synthesis of Hydrolyzable Silicon Group-Containing Acrylic Polymer (B-1)

To a four-necked flask having a stirrer, 43 g of isobutanol was fed, and the resulting mixture was heated to 105° C. A mixture of monomers and a mercapto group-containing compound, containing 6.0 g of butyl acrylate, 73 g of methyl methacrylate, 15 g of stearyl methacrylate, 6 g of γ-methacryloxypropylmethyldimethoxysilane, and 7.0 g of γ-mercaptopropylmethyldimethoxysilane and a radical initiator solution of 2.6 g of azobisisobutyronitrile in 23 g of isobutanol were added dropwise over a period of 4 hours. Then, postpolymerization was performed for 2 hours to prepare an isobutanol solution of a hydrolyzable silicon group-containing acrylic polymer (B-1) having a solid content of 60 percent by weight and a number-average molecular weight of about 1,900 (polystyrene equivalent molecular weight by GPC measurement).

Synthetic Example 6

Synthesis of Hydroxyl Group-Containing Acrylic Polymer (B-2)

An isobutanol solution of the hydrolyzable silicon group-containing acrylic polymer (B-2) having a solid content of 60 percent by weight and a number-average molecular weight of about 1,800 (polystyrene equivalent molecular weight by GPC measurement) was prepared as in Synthetic example 5 except that the mixture containing the monomers and the mercapto-group containing compound contained 36 g of butyl acrylate, 37 g of methyl methacrylate, 13 g of stearyl methacrylate, 14 g of hydroxyethyl methacrylate, and 7.0 g of n-dodecyl mercaptan.

Example 1

To 66.7 g of the isobutanol solution of hydrolyzable silicon group-containing acrylic polymer (B-1) prepared in Synthetic example 5, 0.3 g of a 2 percent by weight methanol solution of L-ascorbic acid was added. After the mixture was stirred, 60 g of hydrolyzable silicon group-terminated oxypropylene polymer (A-3) prepared in Synthetic example 3 was added and the resulting mixture was stirred. The solvent was removed from the mixture under reduced pressure to prepare a curable resin composition having a weight ratio (A-3)/(B-1) of 60/40. The content of L-ascorbic acid functioning as (C) was 30 ppm.

Example 2

A curable resin composition was prepared as in Example 1 except that the 2 percent by weight methanol solution of L-ascorbic acid (C) was added to (A-3); the resulting mixture was stirred and heated to 80° C. for 3 hours; then, the isobutanol solution of (B-1) was added thereto and the resulting mixture was stirred.

Example 3

A curable resin composition having a weight ratio (A-3)/(B-1) of 60/40 was prepared as in Example 1 except that a 1 percent by weight sulfur toluene solution was used instead of the 2 percent by weight methanol solution of L-ascorbic acid. The content of sulfur functioning as (C) was 15 ppm.

Comparative Example 1

A curable resin composition was prepared as in Example 1, but with no L-ascorbic acid (C).

Example 4

To 66.7 g of the isobutanol solution of the hydroxyl group-containing acrylic polymer (B-2) prepared in Synthetic example 6, 0.3 g of a 2 percent by weight methanol solution of L-ascorbic acid was added. The resulting mixture was stirred, and 60 g of the hydroxyl group-terminated oxypropylene polymer (A-1) prepared in Synthetic example 1 was added thereto. The resulting mixture was stirred. The solvent was removed from the mixture under reduced pressure to prepare a resin composition having a weight ratio (A-1)/(B-2) of 60/40. The content of L-ascorbic acid functioning as (C) was 30 ppm.

Comparative Example 2

A resin composition was prepared as in Example 4, but with no 1-ascorbic acid (C).

Example 5

To a four-necked flask having a stirrer, 96.5 g of the allyl group-terminated oxypropylene polymer (A-2) prepared in Synthetic example 2 was fed, and 1 g of 2 percent by weight methanol solution of L-ascorbic acid was added thereto. The resulting mixture was stirred, and 3.5 g of γ-mercaptopropylmethyltrimethoxysilane was added thereto. The resulting mixture was heated to 100° C., and a solution in which 2 g of azobisisobutyronitrile was dissolved in 8 g of toluene was added 4 times every 1 hour in an amount of 2.5 g each. Heating continued for additional 2 hours. Thereby, a curable resin composition containing a hydrolyzable silicon group-terminated oxypropylene polymer was prepared by reaction of (A-2) and γ-mercaptopropyltrimethoxysilane. The content of L-ascorbic acid functioning as (C) was 200 ppm.

Comparative Example 3

A curable resin composition was prepared as in Example 5, but with no L-ascorbic acid (C).

Example 6

To a four-necked flask having a stirrer, 95.5 g of the isocyanato group-terminated oxypropylene polymer (A-4) prepared in Example 4 was fed, 0.9 g of 1 percent by weight sulfur toluene solution was added thereto. The resulting mixture was stirred and heated to 80° C., and then 4.5 g of γ-mercaptopropyltrimethoxysilane was added dropwise over a period of 30 minutes. Thereby, a curable resin composition containing a hydrolyzable silicon group-terminated oxypropylene polymer was prepared by reaction of (A-4) and γ-mercaptopropyltrimethoxysilane. The content of sulfur functioning as (C) was 90 ppm.

Comparative Example 4

A curable resin composition was prepared as in Example 6, but with no sulfur (C).

Example 7

To 99 g of the hydrolyzable silicon group-terminated oxypropylene polymer (A-3) prepared in Synthetic example 3, 0.25 g of 2 percent by weight methanol solution of L-ascorbic acid was added. The resulting mixture was stirred and heated at 80° C. for 3 hours. Then, 1 g of γ-mercaptopropylmethyldimethoxysilane was added thereto. Thereby, a curable resin composition was prepared. The content of L-ascorbic acid functioning as (C) was 50 ppm.

Example 8

A curable resin composition was prepared as in Example 7 except that the 2 percent by weight methanol solution of L-ascorbic acid was used in an amount of 0.15 g. The content of L-ascorbic acid functioning as (C) was 30 ppm.

Example 9

A curable resin composition was prepared as in Example 7 except that 0.3 g of a 1 percent by weight sulfur toluene solution was used instead of the 2 percent by weight methanol solution of L-ascorbic acid. The content of sulfur functioning as (C) was 25 ppm.

Example 10

A curable resin composition was prepared as in Example 7 except that 0.1 g of 10 percent by weight rongalite aqueous solution was used instead of the 2 percent by weight methanol solution of L-ascorbic acid. The content of rongalite functioning as (C) was 100 ppm.

Example 11

To 99 g of the hydrolyzable silicon group-terminated oxypropylene polymer (A-3) prepared in Synthetic example 3, 0.25 g of a 2 percent by weight D-isoascorbic acid ethanol solution was added. The resulting mixture was stirred and heated to 80° C. for 3 hours. Then, 1 g of γ-mercaptopropylmethyldimethoxysilane was added thereto to prepare a curable resin composition. The content of D-isoascorbic acid functioning as (C) was 50 ppm.

Example 12

A curable resin composition was prepared as in Example 11 except that the 2 percent by weight D-isoascorbic acid ethanol solution was used in an amount of 0.15 g. The content of D-isoascorbic acid functioning as (C) was 30 ppm.

(Advantage of Use of D-Isoascorbic Acid)

As shown in Reference example below, D-isoascorbic acid has higher solubility in ethanol than that of L-ascorbic acid and has advantage that an ethanol solution is easily used in adding the reductant, the ethanol solution being safer than that of methanol.

Reference Example

To a 30 ml-glass sample bottle, a predetermined amount of absolute ethanol was fed, and 2 g of L-ascorbic acid was added thereto. The vessel was sealed hermetically. The resulting mixture was stirred at room temperature for 1 hour with a magnetic stirrer using a stirring tip having a length of 10 mm and a diameter of 4 mm to prepare an L-ascorbic acid ethanol solution. The content of L-ascorbic acid in the ethanol solution was measured to be 2.5 percent by weight.

A D-isoascorbic acid ethanol solution was prepared under the same conditions as above except that D-isoascorbic acid was used instead of L-ascorbic acid. The content of D-isoascorbic acid in the ethanol solution was measured to be 3.4 percent by weight.

Comparative Example 5

A curable resin composition was prepared as in Example 7, but with no L-ascorbic acid (C).

<Measurement>

The resin compositions prepared in Examples 1 to 10 and Comparative examples 1 to 4 were introduced into glass vessels and sealed under nitrogen. Then, accelerated storage was performed at 80° C. for 7 days. After accelerated storage, coloration was evaluated by color measurement and visual inspection. Tables 1 to 3 show the results.

<Method for Measuring Color>

A resin composition was charged into an acrylic resin cell having a side of 1 cm and defoamed by centrifugation. A transparent object color was measured with a color difference-turbidity measurement instrument (COH-300A, manufactured by Nippon Denshoku Co., Ltd.) in terms of the $L^*a^*b^*$ calorimetric system. Deionized water was used as a standard sample. The $a^*$ value corresponds to the intensity of red.

<Evaluation by Visual Inspection>

A resin composition in a glass vessel was observed by visual inspection, and evaluated according to the following evaluation criteria.

E: pale yellow to transparent

G: pink to pale red

P: red

T: strong red

TABLE 1

Resin composition including oxyalkylene polymer (A) and acrylic polymer (B).

|  | Composition | | | | Color measurement | | | Evaluation by visual inspection |
|---|---|---|---|---|---|---|---|---|
|  | (A) | (B) | (C) | Mixing procedure | $L^*$ | $a^*$ | $b^*$ |  |
| Example 1 | (A-3) | (B-1) | L-Ascorbic acid 30 ppm | After (C) was added to (B-1), (A-3) was added. | 99.9 | −0.1 | 1.5 | E |
| Example 2 | (A-3) | (B-1) | L-Ascorbic acid 30 ppm | After (C) was added to (A-3), (B-1) was added. | 100 | −0.1 | 1.1 | E |
| Example 3 | (A-3) | (B-1) | Sulfur 15 ppm | After (C) was added to (B-1), (A-3) was added. | 99.7 | −0.1 | 2.0 | E |
| Comparative example 1 | (A-3) | (B-1) | — | — | 95.7 | 4.2 | 5.8 | P |
| Example 4 | (A-1) | (B-2) | L-Ascorbic acid 200 ppm | After (C) was added to (B-2), (A-1) was added. | 99.5 | 0.4 | 2.3 | E |
| Comparative example 2 | (A-1) | (B-2) | — | — | 94.7 | 7.2 | 4.5 | T |

TABLE 2

Resin composition prepared by reaction of oxyalkylene polymer (A) and mercapto group-containing compound (B).

|  | Composition | | | Color measurement | | | Evaluation by visual inspection |
|---|---|---|---|---|---|---|---|
|  | (A) | (B) | (C) | $L^*$ | $a^*$ | $b^*$ |  |
| Example 5 | (A-2) | γ-Mercaptopropyltrimethoxysilane | L-Ascorbic acid 200 ppm | 100 | 0.0 | 1.5 | E |
| Comparative example 3 | (A-2) | γ-Mercaptopropyltrimethoxysilane | — | 89.5 | 9.5 | 7.5 | T |
| Example 6 | (A-4) | γ-Mercaptopropyltrimethoxysilane | Sulfur 90 ppm | 99.9 | 0.2 | 2.5 | E |
| Comparative example 4 | (A-4) | γ-Mercaptopropyltrimethoxysilane | — | 90.1 | 9.2 | 8.0 | T |

TABLE 3

Resin composition including oxyalkylene polymer (A) and mercapto group-containing compound (B).

| | Composition | | | Color measurement | | | Evaluation by visual inspection |
|---|---|---|---|---|---|---|---|
| | (A) | (B) | (C) | L* | a* | b* | |
| Example 7 | (A-3) | γ-Mercaptopropylmethyldimethoxysilane | L-Ascorbic acid 50 ppm | 100 | −0.2 | 1.2 | E |
| Example 8 | (A-3) | γ-Mercaptopropylmethyldimethoxysilane | L-Ascorbic acid 30 ppm | 99.8 | 1.2 | 2.6 | G |
| Example 9 | (A-3) | γ-Mercaptopropylmethyldimethoxysilane | Sulfur 25 ppm | 99.9 | 0.0 | 2.0 | E |
| Example 10 | (A-3) | γ-Mercaptopropylmethyldimethoxysilane | Rongalite 100 ppm | 99.0 | 1.0 | 3.2 | G |
| Example 11 | (A-3) | γ-Mercaptopropylmethyldimethoxysilane | D-isoascorbic acid 50 ppm | 100 | 0.0 | 0.7 | E |
| Example 12 | (A-3) | γ-Mercaptopropylmethyldimethoxysilane | D-isoascorbic acid 30 ppm | 99.8 | 0.8 | 1.5 | E |
| Comparative example 5 | (A-3) | γ-Mercaptopropylmethyldimethoxysilane | — | 93.1 | 8.0 | 7.2 | T |

In Examples where (C)s are added to the compositions, each a* value is less than 0.5 in spite of the production process. This value means that red is imperceptible to the visual inspection. In Comparative examples where none of the (C)s is used, each a* value is 2 or more. This value means that red is surely sensed by visual inspection. The results obviously show a significant improvement.

INDUSTRIAL APPLICABILITY

The present invention provides a resin composition including an oxyalkylene polymer prepared by ring-opening polymerization of an alkylene oxide in the presence of a cobalt-containing double metal cyanide complex catalyst; an acrylic polymer prepared by radical polymerization in the presence of a mercapto group-containing compound and/or a mercapto group-containing compound; and a reductant. There is no excessive coloration, and usage restrictions due to coloration are eliminated. Thus, the resin composition is useful for an adhesive composition or the like.

The invention claimed is:

1. A resin composition comprising:
    an oxyalkylene polymer (A) containing a hydrolyzable silicon group and being prepared by ring-opening polymerization of an alkylene oxide using a cobalt-containing double metal cyanide complex catalyst in the presence of a compound that serves as an initiator and that has an active hydrogen-containing group that can react with the alkylene oxide;
    an acrylic polymer and/or a mercapto group-containing compound (B), the acrylic polymer containing a hydrolyzable silicon group and being prepared by radical polymerization of a monomer including an alkyl (meth) acrylate containing an alkyl group having 1 to 30 carbon atoms in the presence of a mercapto group-containing compound; and
    a reductant (C) which is at least one selected from ascorbic acid and derivatives thereof.

2. A process for producing the resin composition according to claim 1, the process comprising: mixing (A) and (B) in the presence of (C).

3. The resin composition according to claim 1, wherein the oxyalkylene polymer (A) and the acrylic polymer (B) each contain a crosslinkable functional group substantially consisting of the hydrolyzable silicon group.

4. The resin composition according to claim 3, which is curable by a condensation catalyst.

5. The resin composition according to claim 1, which is curable by a condensation catalyst.

6. The resin composition according to claim 4,
    wherein the condensation catalyst is selected from the group consisting of an organic titanium compound; an organic tin compound; organic aluminum compounds; organic zirconium compounds; organic bismuth compounds; amine compounds; organic acids; and compounds prepared by reaction of an organic acid and an amine compound.

7. A method of preventing coloration of a resin composition comprising
    mixing an oxyalkylene polymer (A) containing a hydrolyzable silicon group and being prepared by ring-opening polymerization of an alkylene oxide using a cobalt-containing double metal cyanide complex catalyst in the presence of a compound that serves as an initiator and that has an active hydrogen-containing group that can react with the alkylene oxide and
    an acrylic polymer and/or a mercapto-containing compound (B), the acrylic polymer containing a hydrolyzable silicon group and being prepared by radical polymerization of a monomer including an alkyl(meth) acrylate containing an alkyl group having 1 to 30 carbon atoms in the presence of a mercapto group-containing compound
    in the presence of a reductant (C) which is at least one selected from ascorbic acid and derivatives thereof.

* * * * *